United States Patent [19]

Lampe et al.

[11] Patent Number: 5,023,789

[45] Date of Patent: Jun. 11, 1991

[54] TEMPERATURE COMPENSATED CLOSED LOOP CONTROL OF A HYDRAULICALLY CONTROLLED CLUTCH AND APU STARTING SYSTEM

[75] Inventors: Steven W. Lampe, San Diego; Kourosh Mehr-Ayin, Vista, both of Calif.

[73] Assignee: Sundstrand Corporation, Rockford, Ill.

[21] Appl. No.: 532,675

[22] Filed: Jun. 4, 1990

[51] Int. Cl.⁵ .................... B60K 41/04; F16D 66/00
[52] U.S. Cl. ................................ 364/424.1; 74/866; 192/82 T
[58] Field of Search ............... 364/424.1; 74/208, 866; 192/82 T, 0.02 R, 0.033

[56] References Cited

U.S. PATENT DOCUMENTS

| | | | |
|---|---|---|---|
| 4,037,697 | 7/1977 | Prewzel | 192/82 T |
| 4,072,220 | 2/1978 | Hamada | 192/82 T |
| 4,322,798 | 3/1982 | McCoin | 74/208 |
| 4,468,988 | 9/1984 | Hiramatsu et al. | 74/868 |
| 4,650,045 | 3/1987 | Weible et al. | 192/0.02 R |
| 4,678,069 | 7/1987 | Yoshimura et al. | 192/0.033 |
| 4,811,225 | 3/1989 | Petzold et al. | 364/424.1 |
| 4,935,872 | 6/1990 | Benford et al. | 74/866 |
| 4,936,167 | 6/1990 | Mehta | 364/424.1 |
| 4,975,845 | 12/1990 | Mehta | 74/866 |

Primary Examiner—Salvatore Cangialosi
Attorney, Agent, or Firm—Antonelli, Terry, Stout & Kraus

[57] ABSTRACT

A temperature compensated control system (100) for a hydraulically controlled clutch (18) for controlling a source of rotary power to a load (101) for accelerating the load from a first velocity to a second velocity within a time interval measured from a beginning of the acceleration and ending between first and second times measured from the beginning of the acceleration with the load being variable during the acceleration of the load from the first velocity to the second velocity is disclosed. Gain compensation is provided as a function of temperature of hydraulic fluid within a servo system (110) controlling the clutch. Furthermore, a controller (39) controls the opening of a valve (35) as a function of the sensed temperature during initiation of starting to cause the flow of lubricating fluid into the gearbox to be delayed during the initiation of starting when a sensed temperature is below a set temperature to minimize viscous drag and to cause lubricating fluid to flow immediately into the gearbox when the sensed temperature is above the set temperature.

22 Claims, 3 Drawing Sheets

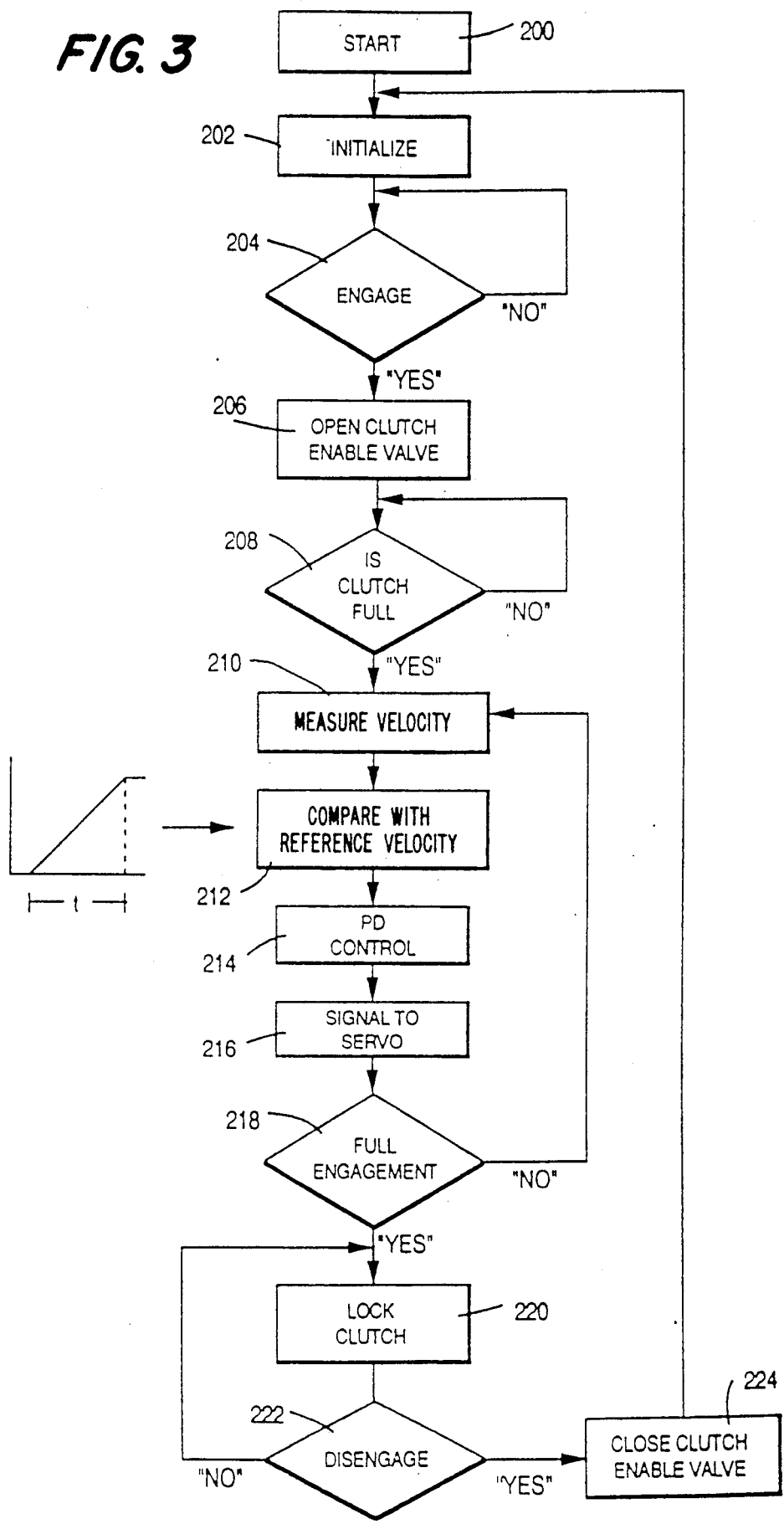

TEMPERATURE COMPENSATED CLOSED LOOP CONTROL OF A HYDRAULICALLY CONTROLLED CLUTCH AND APU STARTING SYSTEM

CROSS-REFERENCE TO RELATED APPLICATION

Reference is made to U.S. patent application Ser. No. 356,273 entitled "Closed Loop Control of a Hydraulically Controlled Clutch", filed on May 24, 1989. Ser. No. 356,273 is incorporated herein by reference in its entirety.

1. Technical Field

The present invention relates to hydraulically controlled clutches for coupling a source of rotary power to a load for accelerating the load from a first velocity to a second velocity within specified time limits measured from the beginning of the acceleration. More particularly, the present invention relates to hydraulically controlled clutches of the aforementioned type for use in auxiliary power units (APU) in airframes.

2. Background Art

U.S. patent application Ser. No. 356,273 entitled "Closed Loop Control of a Hydraulically Controlled Clutch", filed May 24, 1989 discloses a control system for a hydraulically controlled clutch for coupling a source of rotary power to a load for accelerating the load from a first velocity to a second velocity within a time interval measured from a beginning of the acceleration and ending between first and second times measured from the beginning of the acceleration with the load being variable during the acceleration of the load from the first velocity to the second velocity. A preferred application of the system disclosed in Ser. No. 356,273 is in an auxiliary power unit (APU) in an airframe in which a hydraulically controlled clutch selectively couples a turbine and gear reduction transmission having an output rotating at a high velocity, which may be variable in velocity, to an output of the clutch for driving a load which varies during the acceleration from the first velocity to the second velocity with a closed loop velocity control to maintain the acceleration in accordance with a stored program. The time limits in which the acceleration is to occur are chosen to range from a minimum to a maximum time such as 1.8 secs. to 2.5 secs. If the acceleration occurs in less than a minimum time measured from the beginning of the acceleration, high torque loadings would be applied to a gearbox driven by the output of the hydraulically controlled clutch which could result in loadings that would damage the teeth of the gear drive therein. If the time during which the acceleration occurred takes longer than a maximum time interval, the plate life of the clutch plates is drastically limited in comparison with the acceleration of the output of the clutch in a time less than the maximum time limit. Lengthened plate life is a result of limiting excessive slippage between the plates during the acceleration of the output to full velocity. This system works well for accelerating a variable torque load driven by the output of the clutch such as in an APU.

APUs are required to be operational through a wide range of temperatures as a consequence of their utilization in airframes. A typical temperature range through which an APU must operate is −65° F. to 250° F. During long flights and in air fields located in polar climates, the outside temperature may approach temperatures such as −65° F. which causes the APU including servo control system to be cold chilled to these temperatures. After landing, during a long flight, the APU may be chilled to a temperature approaching −40° F. even though the outside temperature of an airfield is well above that figure. On the other hand, during operation on the ground for generating electrical power and for starting of an airframe, the APU in warmer climates may approach operating temperatures close to 250° F.

As a consequence of the wide temperature range in which an APU must operate, the hydraulic fluid used with the servo control system of the hydraulically controlled clutch and the lubricating fluid contained in the gear case of the APU and gear reduction transmission which is coupled to the output of the turbine contained in the APU cycles through a wide range of viscosity. As a consequence of the wide temperature range causing a change in viscosity and consequently the overall system gain change, the constant gains of the PD or PID control algorithms in the hydraulically controlled servo system cannot control the engagement of the hydraulic clutch within the intended range of 1.8 and 2.5 secs. which are set by the programmed speed program or desired acceleration. In practice, the gain of the system, which was assumed to be independent of temperature, increases logarithmically as a function of a decrease in temperature as a consequence of the change of viscosity of the hydraulic fluid and other characteristics of the servo control system of the hydraulically controlled clutch.

As a consequence of an APU being required to operate in extremely low temperatures as described above, a starting system for the gas turbine contained in the APU must be especially designed to rotate the turbine up to a self-sustaining speed when substantial drag is caused by the highly viscous lubricating fluid contained within the gear case of the APU. If the turbine within the APU was required to be started while the gear case of the APU was filled with lubricating fluid to its normal level, the high viscous drag caused by the highly viscous lubricating fluid in extremely cold conditions could prevent successful starting as a consequence of the starting system not being able to rotate the turbine up to self-sustaining speed resultant from the high power demand placed upon electric batteries or hydraulic starting systems. As a result, the normal practice at the time of shutting down an APU is to open a drain down valve which is coupled to the lubrication fluid supply of the system to permit the lubricating fluid level within the gear case of the APU to drain down to a minimum level so as to minimize viscous drag when the turbine is to be started in extremely cold temperatures. A valve controlling the flow of lubricating fluid into the gear case from the pressurized lubrication fluid supply is maintained closed after the APU has been stopped up to a time during the starting of the turbine when the APU velocity is sensed as being self-sustaining. This practice is necessary to lighten the starting load on the starting system of the turbine for extremely low temperature starts, but has the disadvantages of potentially damaging or increasing the wear on the lubricated components within APU gearbox when temperatures are elevated such as a range above 0° F. in which the viscosity of the lubricating fluid is sufficiently low that additional lubrication of the gear train would be desirable to minimize wear or damage.

DISCLOSURE OF THE INVENTION

The present invention is a temperature compensated control system for a hydraulically controlled clutch for coupling a source of rotary power to a load for accelerating the load from a first velocity to a second velocity within a time measured from a beginning of the acceleration and ending between first and second times measured from the beginning of the acceleration with the load being variable during the acceleration of the load from the first velocity to the second velocity and a lubrication control system for a power unit in which the temperature of lubricating fluid is sensed and a valve controlling the flow of lubricating fluid into the gearbox of the power unit during rotation of the power unit is opened as a function of the sensed temperature during initiation of starting of the power unit.

The control system for a hydraulically controlled clutch of the present invention has the advantage over the prior art described above in that the gains of the servo control algorithms of the clutch are compensated as a function of temperature to provide constant system gain independent of temperature for the controlled acceleration of the output of the clutch from a first velocity to a second velocity within specified time limits over wide temperature ranges. Preferably the gain compensation is such that the gains of the control algorithms of the servo system decreases logarithmically as a function of temperature to provide an overall system gain which is independent of temperature.

A starting system for a power unit of the presentation has the advantage over the prior art discussed above in that increased wear or possible damage of lubricated components within the gearbox of the power unit is avoided by controlling the pumping of lubricating fluid into the gearbox as a function of sensed temperature during initiation of starting. The control valve controlling the flow of lubricating fluid into the gearbox which has been drained down after turning off the power unit is maintained closed until the velocity of the turbine during initiation of starting reaches self-sustaining speed if the temperature is below a predetermined temperature such as 0° F. and is immediately opened during initiation of starting if the sensed temperature of the lubricating fluid is above the predetermined temperature. The same temperature sensor used by the aforementioned temperature compensated control system is utilized by the starting system.

A control system for a hydraulically controlled clutch for coupling a source of rotary power to a load for accelerating the load from a first velocity to a second velocity within a time interval measured from a beginning of the acceleration and ending between first and second times measured from the beginning of the acceleration with the load being variable during the acceleration of the load from the first velocity to the second velocity in accordance with the invention includes a source of pressurized hydraulic fluid; a temperature sensor coupled to the hydraulic fluid which provides a temperature signal of the temperature of the hydraulic fluid; a servo valve, having an inlet coupled to the source of pressurized fluid and an outlet coupled to the hydraulically controlled clutch, the servo valve being responsive to a control signal to vary the pressure of hydraulic fluid applied to the hydraulically controlled clutch to vary the coupling between the source of rotary power and an output shaft which is applied to the load; a sensor for producing a velocity signal proportional to the velocity of the output shaft; a stored program controlling a programmed acceleration of the load from the first velocity to the second velocity within a time interval measured from the beginning of the acceleration and ending between the first and second times; and a controller, responsive to the stored program, the velocity signal and the temperature signal, for producing the control signal which is a function of a difference between the velocity signal and a desired velocity of the output shaft during acceleration from the first velocity to the second velocity by the stored program and a gain control signal which is a function of the temperature signal. The stored program may store data which specifies a programmed acceleration of the load from the first velocity to the second velocity within a time interval measured from the beginning of the acceleration and ending between the first and second times. The gain control signal decreases logarithmically as a function of the temperature signal. The logarithmic decrease in the gain control signal may be produced by a look-up table with values within the look-up table being chosen as a function of the temperature signal or, alternatively, may be produced by a stored equation which is a function of the temperature signal to produce the gain control signal. The controller may be a proportional and differential controller and the control signal is proportional to and a differential of a difference between the velocity signal and the desired velocity controlled by the program and proportional to the gain control signal. Alternatively, the controller is a proportional, integral and differential controller and the control signal is proportional to, a differential of and an integral of the difference between the velocity signal and the desired velocity determined by the controller by integrating a set acceleration specified by the stored program and proportional to the gain control signal and the stored program specifies a single value of acceleration for accelerating the load from the first velocity to the second velocity. The load which is accelerated may be a gearbox driving at least a first load which is variable during the acceleration between the first and second velocities.

A starting system for a power unit in accordance with the invention includes a prime mover having an output; a gearbox containing lubricating fluid which is pumped through the gearbox; a temperature sensor coupled to the lubricating fluid for providing a temperature signal proportional to a temperature of the lubricating fluid; a lubricating fluid valve which is contained in a lubricating fluid circuit connecting the gearbox to a lubricating fluid supply that controls lubricating fluid flow into the gearbox from the lubricating fluid supply and lubricating fluid flow out of the gearbox to the lubricating fluid supply in response to a control signal; a lubricating fluid pump for pumping lubricating fluid through the lubricating fluid circuit when the power unit is rotating; and a power unit controller responsive to the temperature signal for controlling activation of the power unit and producing the control signal to cause the inlet valve to remain closed for a predetermined time interval after initiation of starting of the power unit if the temperature signal is below a set temperature. The control signal causes the inlet valve to open immediately after the initiation of starting of the power unit if the temperature signal is above the set temperature.

BRIEF DESCRIPTION OF THE DRAWINGS

FIG. 3 is a flowchart illustrating the operation of the clutch control of FIG. 1.

BEST MODE FOR CARRYING OUT THE INVENTION

Figure 1:
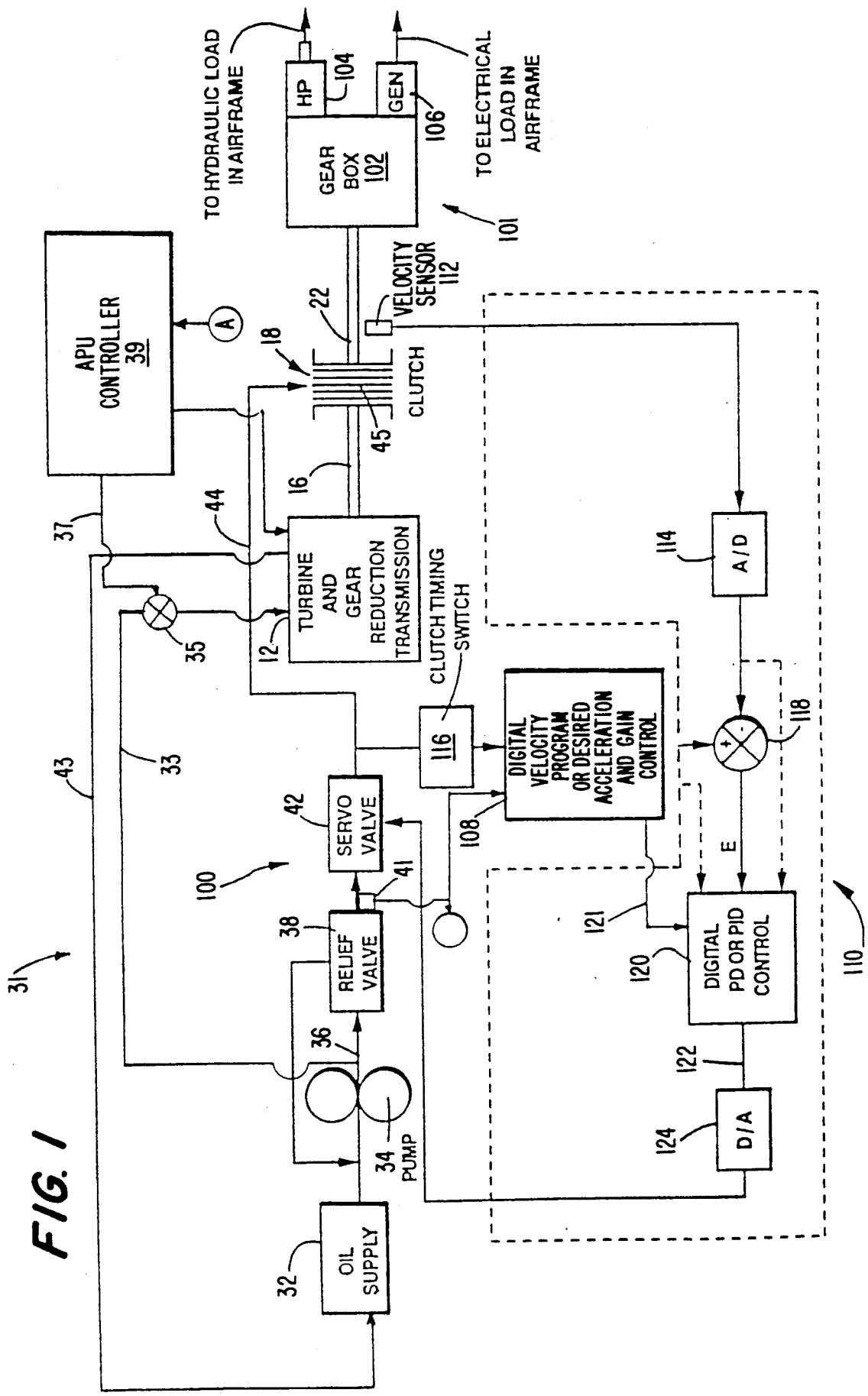
FIG. 1 illustrates a block diagram of a control system for a hydraulically controlled clutch and a lubrication control system for a power unit in accordance with the present invention.

FIG. 1 illustrates a block diagram of an APU 100 in accordance with the present invention including a control system for a hydraulically controlled clutch and a lubrication control system for a power unit in accordance with the present invention. The APU 100 functions to selectively couple output power from a turbine and gear reduction transmission 12 to a load 101 which represents a variable torque during a starting time interval of the turbine. Coupling of rotary power from the output 16 of the turbine and gear reduction transmission 12 is through a hydraulically controlled clutch 18 having a plurality of plates 45 and an output 22 which drives load 101. The load 101 is designed to be accelerated from a stop to a full velocity in a time range such as 1.8 secs. to 2.5 secs. which is controlled by the stored program 108 as described below. The engagement of the clutch plates 45 is controlled by oil flow through the servo valve 42 by controller 110 as described below. If acceleration of the output 22 occurs for a time interval longer than the maximum time limit (2.5 secs.) during which acceleration is to occur, tests have shown that the life of the plates 45 in the hydraulically actuated clutch 18 is reduced in comparison when the acceleration of the output is made from a stop to full velocity in a time less than the maximum time limit. Additionally, acceleration of the output 22 to full velocity in less than a minimum time limit (1.8 secs.) is not permitted to avoid damaging the gearbox 102 of the load 101 as a consequence of loading the input with a torque higher than a rated torque of the teeth of the gear drive therein. The load 101 includes at least one hydraulic pump 104 and an electrical generator 106. The hydraulic pump 104 has a characteristic such that the load torque to drive it as a function of velocity from stop to full velocity is non-linear. The generator 106 has a characteristic caused by oil viscous drag in a cooling mechanism within the generator which varies as a function of the velocity during acceleration of the generator from stop to full velocity. As a consequence of at least the hydraulic pump 104 representing a non-linear load to the gearbox during acceleration from stop to full velocity, the torque load represented by the input of the gearbox 102 which is driven by the output 22 of the clutch varies during the acceleration substantially from zero to full velocity.

Figure 2A:
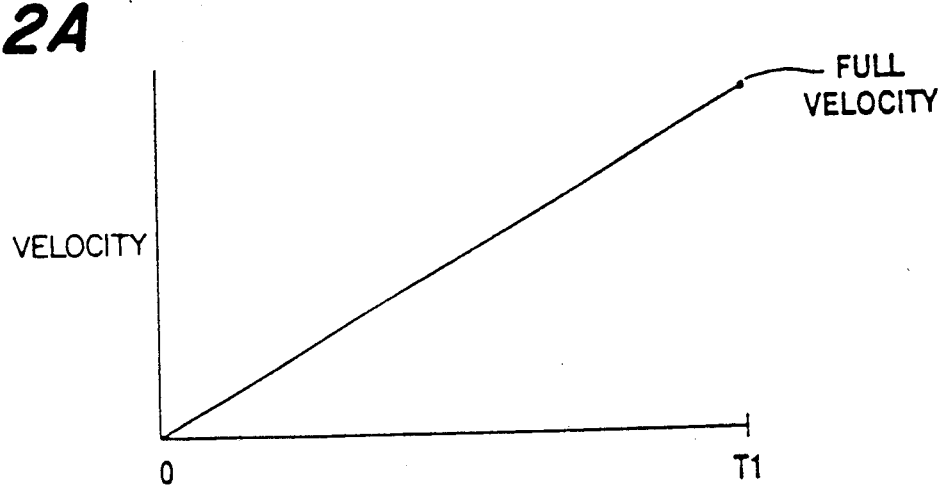
FIG. 2A illustrates the acceleration of the output of the hydraulically controlled clutch as a function of time.
Figure 2B:
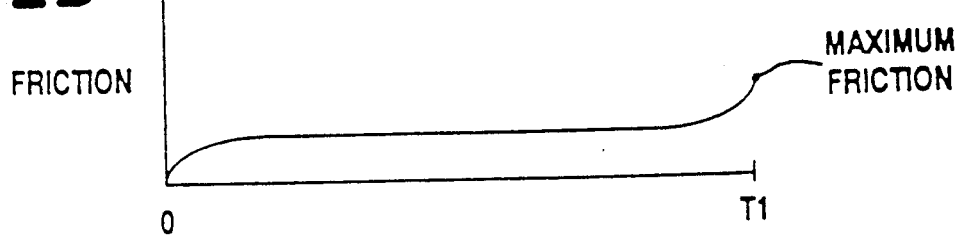
FIG. 2B illustrates the variation of the coefficient of friction of the hydraulically controlled clutch as a function of time.
Figure 2C:
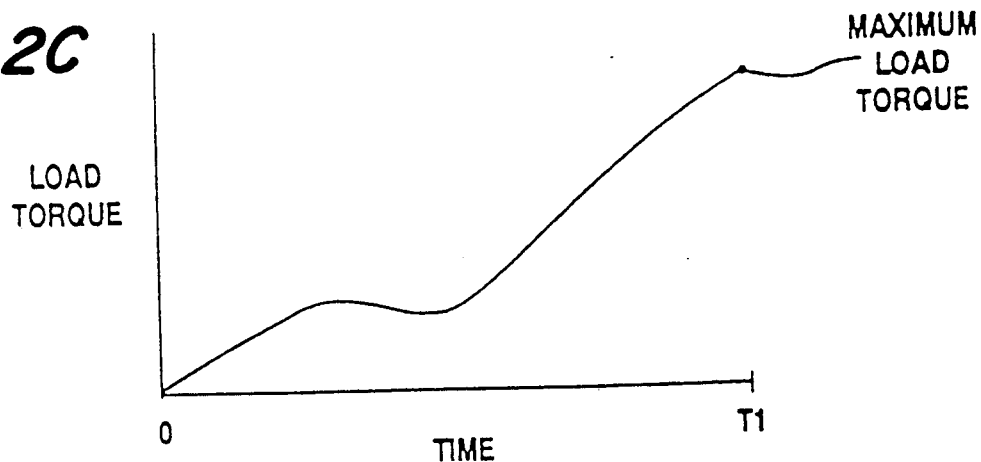
FIG. 2C illustrates the variation of the load driven by the output of the hydraulically controlled clutch as a function of time.

FIG. 2C illustrates a possible variation of the load torque represented by the load torque represented by the gearbox 102 to the output 22 of the hydraulic clutch 18 with it being understood that other non-linear loads would be provided by the gearbox 102 depending upon individual characteristics of the hydraulic pump 104 and generator 106 chosen and additionally whether output power from either or both of the hydraulic pump and generator was being drawn during acceleration of the gearbox from stop to full velocity. Additionally, the coefficient of friction of the clutch 18 varies dynamically during the acceleration of the output 22 from stop to full velocity as illustrated in FIG. 2B. The desired speed control program 108, as illustrated in FIG. 2A, varies linearly as a function of time between zero and full velocity over a time interval equal to T1. It should be understood that in the preferred embodiment of the present invention that time elapsed between zero and T1 is midway between the lower time limit of 1.8 secs. and the upper time limit of 2.5 secs.

The oil (lubricating fluid) supply circuit 31 for the hydraulic clutch 18 is described as follows. Oil supply 32 supplies oil to pump 34 which provides pressurized oil on output 36 which is applied to relief valve 38 which regulates the output pressure of the pump 34 by feeding oil back to the inlet when the output pressure exceeds the rated pressure of the relief valve at which the feedback opens and further supplies pressurized oil to an inlet oil circuit 33 through which oil flows into the gearbox of the turbine in gear reduction transmission 12. A control valve 35, controls the flow of oil into and out of the gearbox of a turbine and gear reduction transmission 12 under the control of a control signal outputted on line 37 by APU controller 39. Valve 35 is opened as a function of temperature sensed by temperature sensor 41 which is the same temperature sensor used for sensing oil temperature for varying the gain of control 120 as explained below. Specifically, valve 35 is maintained in an open state during self-sustaining rotation of the power unit to permit pressurized lubricating fluid from the oil supply 32 to flow into the gearbox. Additionally, during initiation of starting, the valve 35 is maintained in a fully closed position when the temperature sensed by temperature sensor 41 is below a predetermined temperature such as 0° F. and is fully open during initiation of starting of the turbine when the sensed temperature is above the predetermined temperature. Oil flow in the lubricating fluid circuit 31 from the gearbox of the turbine and gear reduction transmission 12 is through an outlet oil circuit 43 through which oil flows from the gearbox to the oil supply 32. The valve 35 controls the flow of lubricating fluid from the gearbox of the turbine and gear reduction transmission 12 to the oil supply 32 under the control of a control signal on line 37 from the APU controller 39. The valve 35 is fully open during self-sustaining operation of the turbine. Upon stopping of the turbine, the APU controller 39 commands the valve 25 to open to permit the level of lubricating fluid within the gearbox of the turbine and gear reduction transmission 12 to drain down to a minimal level to minimize viscous drag which would be applied to the turbine and gear reduction transmission by a normal level of lubricating fluid within the gearbox during initiation of starting by a starter (not illustrated) coupled to the turbine. As a consequence of the control of the valve 35 to open up immediately upon initiation of starting when the temperature sensor 41 outputs a sensed temperature above a predetermined temperature, draining down of the oil level within the gearbox of the turbine and gear reduction transmission 12 does not accelerate wear as a consequence of the immediate supply of oil to the gear case during initiation of starting.

Servo control valve 42 is controlled by an applied control signal as follows. Controller 110 provides a closed loop servo control which produces the control signal applied to the servo valve 42. A velocity sensor 112 produces a signal which is proportional to the velocity of the output 22 of the hydraulic clutch 18. The velocity signal produced by the sensor 112 is converted from analog to digital by A to D converter 114. A clutch timing switch 116 produces an output signal at time 0 of the velocity program illustrated in FIG. 2A. The signal produced by the clutch timing switch 116 synchronizes the program 108 which may be in the form of a constant acceleration or a series of velocity values which are read out synchronously during the accelerating of the gearbox 102 from stop to full velocity in accordance with the velocity program of FIG. 2A. Summer 118 produces an error signal proportional to the difference of the actual velocity signal produced by the velocity sensor 112 and the desired velocity at the time of comparison. The error signal E is applied to a digital proportional and differential (PD) or digital proportional, differential and integral (PID) control 120 of conventional design. Alternatively, a set acceleration may be applied to a control 120 from the program 108 which integrates the acceleration to produce the desired velocity program. The control 120 amplifies the error signal E with a PD or PID characteristic. The dotted lines indicate connections when the aforementioned set acceleration and PID control is utilized.

The program 108 further produces a gain control signal on output 121 which is a function of the temperature sensed by temperature sensor 41. The stored program 108 produces the gain control signal which decreases the gain of the digital control 120 logarithmically with a decrease in temperature sensed by temperature sensor 41 which, as stated above, is also used for the control of oil to and from the turbine and gear reduction transmission. The rate of logarithmic decrease is primarily a function of the particular lubricating fluid being used with it being possible to compensate for other temperature varying characteristics of the hydraulic servo control system of the clutch 18. The logarithmic decrease in the gain of the digital control 120, which occurs in response to the temperature sensed by sensor 41, compensates for the temperature dependent logarithmic increase in the viscosity of the lubricating fluid which results in a gain which is constant independent of temperature variation over the operating temperature range of the APU. The logarithmic decrease in the gain control signal outputted on line 121 may be produced by a look-up table with gain values within the look-up table being selected as a function of the temperature signal produced by temperature sensor 41. Alternatively, the gain control signal may be produced by calculating the gain control signal with a stored equation which is a function of the temperature signal. Either of the aforementioned techniques for generating the gain control signal within the program 108 may be in accordance with standard data retrieval and programming methods. The particular lubricating fluid being used determines the look-up values or the programmed equation for determining the gain control signal on line 121.

The servo-control signal 122 outputted by the digital control 120 is independent of temperature. The control signal 122 is proportional to and a differential of the error signal outputted by summer 118 and further may be an integral thereof provides the necessary high frequency response to modulate the pressure applied on control line 44 to the hydraulically controlled clutch 18 to cause the velocity of the output 22 of the hydraulic clutch to follow the desired velocity program of FIG. 2A. The servo-control signal 122 is converted from digital to analog by digital-to-analog converter 124 prior to the application to the servo valve 42. It should be understood that the desired velocity program of FIG. 2A of accelerating the gearbox 102 which drives non-linear loads represented by the hydraulic pump 104 and the generator 106 during the acceleration from stop to full velocity could not be achieved without the combination of the closed control and hydraulic servo system. Otherwise, the various perturbations in the system would cause the actual acceleration of the gearbox 102 to vary outside of the lower and upper limits described above. Furthermore, the temperature gain compensation provided to the digital control 120 by the program 108 further prevents possible deviation of the acceleration from within the desired time range and further lessens the variation of the time of acceleration from the first velocity to the second velocity from the desired midpoint which could occur as just a consequence of attempts to engage the clutch 18 at temperatures near the limits of the temperature range at which the APU is to operate.

FIG. 3 illustrates a flowchart of the operation of the clutch control 100 of the present invention. Operation proceeds from starting point 200 to initialization of the system at point 202. At point 204 a determination is made if the clutch is to be engaged. If the answer is "yes" at point 204, servo valve 42 is opened at point 206. At decision point 208 a determination is made if the hydraulic system of the clutch 18 is full of fluid. At point 208 when the answer is "yes" the clutch timing switch 116 starts the acceleration cycle during which velocity sensor 112 is interrogated at point 210 by controller 110. At point 212, the error signal E is determined. At point 214, the PD or PID control 120 amplifies the error signal E to generate the servo-control signal 122 which, as described above, is independent of temperature as a consequence of the gain control signal on line 121 from the program 108 providing temperature gain compensation. The servo-control signal 122 is applied to servo valve 42 at point 216. At decision point 218 a determination is made of the final velocity of FIG. 2A is reached. If the answer is "no", the operation loops back to point 210. If the answer is "yes" at decision point 218, the program proceeds to point 220 where the clutch is fully engaged. At point 222 a decision is made whether to disengage the clutch. If the answer is "no" at point 222, the operation loops back to point 220. If the answer is "yes" at point 222, operation proceeds to point 224 where the servo valve is shut off and the operation loops back to point 202. It should be understood that other operational sequences are within the scope of the invention. While the preferred embodiment of the present invention is an APU utilized in an airframe, it should be understood that other implementations of the invention are possible where it is necessary to drive a non-linear load between first and second velocities without substantial variation from a desired velocity program.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A control system for a hydraulically controlled clutch for coupling a source of rotary power to a load for accelerating the load from a first velocity to a second velocity within a time interval measured from a beginning of the acceleration and ending between first and second times measured from the beginning of acceleration with the load being variable during the acceleration of the load from the first velocity to the second velocity comprising:
   a source of pressurized hydraulic fluid;
   a temperature sensor coupled to the hydraulic fluid which provides a temperature signal of a temperature of the hydraulic fluid;
   a servo valve, having an inlet coupled to the source of pressurized fluid and an outlet coupled to the hydraulically controlled clutch, the servo valve being responsive to a control signal to vary the pressure of hydraulic fluid applied to the hydraulically controlled clutch to vary the coupling between the source of rotary power and an output shaft which is coupled to the load;
   a sensor for producing a velocity signal proportional to the velocity of the output shaft;
   a stored program controlling a programmed acceleration of the load from the first velocity to the second velocity within a time interval measured from the beginning of the acceleration and ending between the first and second times; and
   a controller, responsive to the stored program, the velocity signal and the temperature signal, for producing the control signal which is a function of a difference between the velocity signal and a desired velocity of the output shaft during acceleration from the first velocity to the second velocity by the stored program and a gain control signal which is a function of the temperature signal.

2. A control system in accordance with claim 1 wherein:
   the gain control signal decreases logarithmically as a function of the temperature signal.

3. A control system in accordance with claim 2 wherein:
   the logarithmic decrease in the gain control signal is produced by a look-up table with gain values within the look-up table being selected as a function of the temperature signal.

4. A control system in accordance with claim 2 wherein:
   the logarithmic decrease in the gain control signal is produced by a stored equation which is a function of the temperature signal.

5. A control system in accordance with claim 1 wherein:
   the controller is a proportional and differential controller and the control signal is proportional to and a differential of a difference between the velocity signal and the desired velocity controlled by the program and proportional to the gain control signal.

6. A control system in accordance with claim 2 wherein:
   the controller is a proportional and differential controller and the control signal is proportional to and a differential of a difference between the velocity signal and the desired velocity controlled by the program and proportional to the gain control signal.

7. A control system in accordance with claim 3 wherein:
   the controller is a proportional and differential controller and the control signal is proportional to and a differential of a difference between the velocity signal and the desired velocity controlled by the program and proportional to the gain control signal.

8. A control system in accordance with claim 4 wherein:
   the controller is a proportional and differential controller and the control signal is proportional to a differential of a difference between the velocity signal and the desired velocity controlled by the program and proportional to the gain control signal.

9. A control system in accordance with claim 1 wherein:
   the controller is a proportional, integral and differential controller and the control signal is proportional to, a differential of and an integral of a difference between the velocity signal and the desired velocity determined by the controller by integrating a set acceleration specified by the stored program and proportional to the gain control signal; and
   the stored program is a single value of acceleration for accelerating the load from the first velocity to the second velocity.

10. A control system in accordance with claim 2 wherein:
    the controller is a proportional, integral and differential controller and the control signal is proportional to, a differential of and an integral of a difference between the velocity signal and the desired velocity determined by the controller by integrating a set acceleration specified by the stored program and proportional to the gain control signal; and
    the stored program is a single value of acceleration for accelerating the load from the first velocity to the second velocity.

11. A control system in accordance with claim 3 wherein:
    the controller is a proportional, integral and differential controller and the control signal is proportional to, a differential of and an integral of a difference between the velocity signal and the desired velocity determined by the controller by integrating a set acceleration specified by the stored program and proportional to the gain control signal; and
    the stored program is a single value of acceleration for accelerating the load from the first velocity to the second velocity.

12. A control system in accordance with claim 4 wherein:
    the controller is a proportional, integral and differential controller and the control signal is proportional to, a differential of and an integral of a difference between the velocity signal and the desired velocity determined by the controller by integrating a set acceleration specified by the stored program and proportional to the gain control signal; and
    the stored program is a single value of acceleration for accelerating the load from the first velocity to the second velocity.

13. A control system in accordance with claim 5 wherein:
the stored program is a series of velocity values which are read out synchronously during the accelerating of the load from the first velocity to the second velocity.

14. A control system in accordance with claim 6 wherein:
the stored program is a series of velocity values which are read out synchronously during the accelerating of the load from the first velocity to the second velocity.

15. A control system in accordance with claim 7 wherein:
the stored program is a series of velocity values which are read out synchronously during the accelerating of the load from the first velocity to the second velocity.

16. A control system in accordance with claim 8 wherein:
the stored program is a series of velocity values which are read out synchronously during the accelerating of the load from the first velocity to the second velocity.

17. A control system in accordance with claim 1 wherein the load comprises:
a gearbox driving at least a first load which is variable during the acceleration between the first and second velocities.

18. A control system in accordance with claim 2 wherein the load comprises:
a gearbox driving at least a first load which is variable during the acceleration between the first and second velocities.

19. A control system in accordance with claim 3 wherein the load comprises:
a gearbox driving at least a first load which is variable during the acceleration between the first and second velocities.

20. A control system in accordance with claim 4 wherein the load comprises:
a gearbox driving at least a first load which is variable during the acceleration between the first and second velocities.

21. A control system in accordance with claim 5 wherein the load comprises:
a gearbox driving at least a first load which is variable during the acceleration between the first and second velocities.

22. A control system in accordance with claim 9 wherein the load comprises:
a gearbox driving at least a first load which is variable during the acceleration between the first and second velocities.

* * * * *